(12) United States Patent
Costantini

(10) Patent No.: US 12,138,882 B1
(45) Date of Patent: *Nov. 12, 2024

(54) SYSTEM AND METHOD FOR WASTE COMPACTOR REMOTE CONTROL AND MONITORING

(71) Applicant: WM INTELLECTUAL PROPERTY HOLDINGS, L.L.C., Houston, TX (US)

(72) Inventor: Angelo Costantini, Glastonbury, CT (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,005

(22) Filed: Jul. 11, 2022

Related U.S. Application Data

(63) Continuation of application No. 17/459,055, filed on Aug. 27, 2021, now Pat. No. 11,383,471.

(60) Provisional application No. 63/071,802, filed on Aug. 28, 2020.

(51) Int. Cl.
| | |
|---|---|
| *B30B 9/30* | (2006.01) |
| *G05B 19/04* | (2006.01) |
| *H04L 67/125* | (2022.01) |
| *G08C 17/00* | (2006.01) |

(52) U.S. Cl.
CPC ........ *B30B 9/3007* (2013.01); *G05B 19/0405* (2013.01); *H04L 67/125* (2013.01); *G08C 17/00* (2013.01)

(58) Field of Classification Search
CPC . B03B 9/3007; G05B 19/0405; H04L 67/125; G08C 17/00
See application file for complete search history.

(56) References Cited

U.S. PATENT DOCUMENTS

| | | | |
|---|---|---|---|
| 4,773,027 A | 9/1988 | Neumann | |
| 5,088,396 A * | 2/1992 | Thomas | ................ B30B 9/3046 100/229 A |
| 5,967,028 A | 10/1999 | Schomisch et al. | |
| 6,003,441 A | 12/1999 | Little | |
| 6,055,902 A | 5/2000 | Harrop et al. | |
| 6,561,085 B1 | 5/2003 | Durbin et al. | |

(Continued)

FOREIGN PATENT DOCUMENTS

| | | |
|---|---|---|
| FR | 2695346 | 9/1992 |
| WO | 1996/022238 | 7/1996 |
| WO | 2019/158783 | 8/2019 |

OTHER PUBLICATIONS

Marathan; Printout of webpage https://www.marathonequipment.com/; printed Aug. 27, 2021; 8 pages.

*Primary Examiner* — Kidest Bahta
(74) *Attorney, Agent, or Firm* — Greenberg Traurig LLP

(57) ABSTRACT

A system and method including a control/monitoring unit that is either integrated with or exterior-mounted on a waste compactor are provided. The unit can have control functionality, monitoring functionality, or both control and monitoring functionality with respect to the waste compactor. The unit can also include a remote on/off control feature which gives a user the ability to remote start/stop the waste compactor and render it operable/inoperable from another remote location.

2 Claims, 3 Drawing Sheets

(56) References Cited

U.S. PATENT DOCUMENTS

| | | | |
|---|---|---|---|
| 7,145,450 B2 | 12/2006 | Brown | |
| 7,406,402 B1 | 7/2008 | Waitkus, Jr. | |
| 7,481,160 B1 * | 1/2009 | Simon | B30B 9/3007 |
| | | | 60/329 |
| 8,371,213 B2 | 2/2013 | Correale, Jr. et al. | |
| 8,776,680 B2 | 7/2014 | Zimmerman et al. | |
| 10,564,029 B2 | 2/2020 | Waite et al. | |
| 10,585,964 B2 | 3/2020 | Flood | |
| 11,383,471 B1 | 7/2022 | Costantini | |
| 2003/0192900 A1 * | 10/2003 | Petzitillo, Jr. | B65F 1/16 |
| | | | 220/745 |
| 2006/0290491 A1 * | 12/2006 | Wagner | G06Q 10/08 |
| | | | 340/539.26 |
| 2007/0209846 A1 * | 9/2007 | Wilson | B65F 1/1638 |
| | | | 180/65.1 |
| 2008/0198021 A1 * | 8/2008 | Flood | B30B 9/3007 |
| | | | 220/200 |
| 2010/0071572 A1 * | 3/2010 | Carroll | B30B 9/3007 |
| | | | 100/229 A |
| 2011/0238742 A1 * | 9/2011 | Birkmann | G08C 17/02 |
| | | | 709/203 |
| 2014/0041535 A1 | 2/2014 | Shearer et al. | |
| 2019/0019167 A1 | 1/2019 | Candel et al. | |

\* cited by examiner

SYSTEM AND METHOD FOR WASTE COMPACTOR REMOTE CONTROL AND MONITORING

RELATED APPLICATIONS

This application is a continuation application and claims the benefit, and priority benefit, of U.S. patent application Ser. No. 17/459,055, filed Aug. 27, 2021, which claims the benefit, and priority benefit, of U.S. Provisional Patent Application Ser. No. 63/071,802, filed Aug. 28, 2020, the disclosure and contents of which are incorporated by reference herein in their entirety.

BACKGROUND

Field of Invention

This invention relates generally to waste compactor control and monitoring.

Description of the Related Art

Industrial and commercial waste compactors are well known in the art. These compactors can be utilized for quick and efficient compacting and processing of solid waste and recyclable materials. Representative examples of existing waste compactors are available from, e.g., J.V. Manufacturing, Inc. of Springdale, Arkansas.

It is also well known in the art to utilize monitoring systems to measure waste compactor status and functionality, including but not limited to fullness levels, in real time.

These previous waste compactors and monitoring systems can be improved or enhanced to include additional functionality.

Improvements in this field are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a control/monitoring unit is provided. The unit can be mounted or otherwise located on the interior or exterior surface or region of the waste compactor and can include a power supply, a microcontroller, a transducer, a cell antenna, a modem, a GPS antenna, a fitting that is connectable to a hydraulic hose and a conduit that connects to the waste compactor. The unit can be mounted internally or externally on the compactor and can monitor, measure and determine when the compactor is nearing fullness capacity. A remote disable switch can be operationally connected to the waste compactor and can be used to enable or disable operation of the waste compactor from a remote location.

In certain illustrative embodiments, a remote disablement system for a waste compactor is provided that includes a transmitter/receiver on the waste compactor, an on/off switch on the waste compactor, and a remote signal device. The remote signal device can be capable of sending a deactivation signal to the transmitter/receiver on the waste compactor. The transmitter/receiver can be capable of communicating with the on/off switch and causing the on/off switch to turn the waste compactor off in response to the deactivation signal.

In certain illustrative embodiments, a remote enablement system for a waste compactor is provided. The remote signal device can be capable of sending an activation signal to the transmitter/receiver on the waste compactor. The transmitter/receiver can be capable of communicating with the on/off switch and causing the on/off switch to turn the waste compactor on in response to the activation signal.

In certain illustrative embodiments, a method of deactivating a waste compactor from a remote location is provided. A deactivation signal can be provided from a remote signal device to a transmitter/receiver on a waste compactor. The deactivation signal can cause an on/off switch on the waste compactor to turn the waste compactor off (i.e., shut the compactor down).

In certain illustrative embodiments, a method of activating a waste compactor from a remote location is provided. An activation signal can be provided from a remote signal device to a transmitter/receiver on a waste compactor. The activation signal can cause an on/off switch on the waste compactor to turn the waste compactor on (i.e., start or restart the compactor).

BRIEF DESCRIPTION OF THE DRAWINGS

A better understanding of the presently disclosed subject matter can be obtained when the following detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

Various illustrative embodiments of an improved system and method for waste compactor control and monitoring are described herein.

In certain illustrative embodiments, the presently disclosed system can include a control/monitoring unit that is integrated with, or interior-mounted on, or exterior-mounted on, or otherwise functionally connected with the waste compactor. As used herein, the phrase "control/monitoring" when used in connection with a unit or device means that the unit or device can have control functionality, monitoring functionality, or both control and monitoring functionality with respect to the waste compactor, as applicable to the particular described embodiment.

In certain illustrative embodiments, the control/monitoring unit can utilize location services such as GPS Tracking for allowing a person or entity to determine the location of the waste compactor. Benefits of GPS tracking for a waste services company include, without limitation, lowering administrative costs for better accountability and increased cost savings, improved customer service, improved efficiency by understanding equipment utilization, budgeting (and decisioning) for the future, equipment maintenance, reduced loss, theft prevention, easily located assets, knowing where assets have been, and easing the burden of audits.

In certain illustrative embodiments, the control/monitoring unit can also include a remote on/off control feature which gives a user the ability to remote start/stop the waste compactor and render it operable/inoperable from another location.

In certain illustrative embodiments, the control/monitoring unit can be battery powered, so that it is not necessary for the unit to be hard-wired to the waste compactor as a power source.

Figure 1:
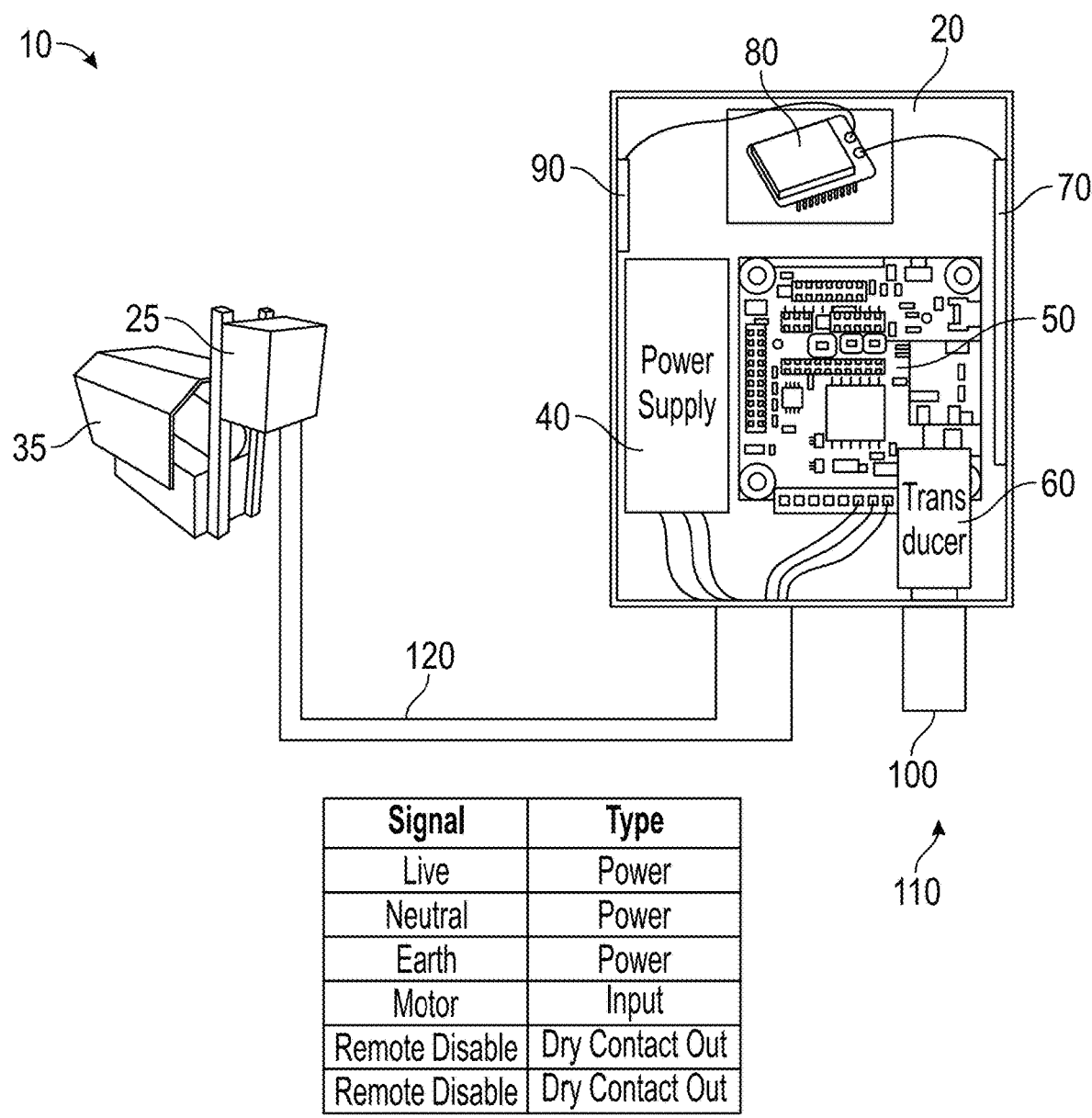
FIG. 1 is a waste compactor and a control/monitoring unit in accordance with an illustrative embodiment of the presently disclosed subject matter.
Figure 2:
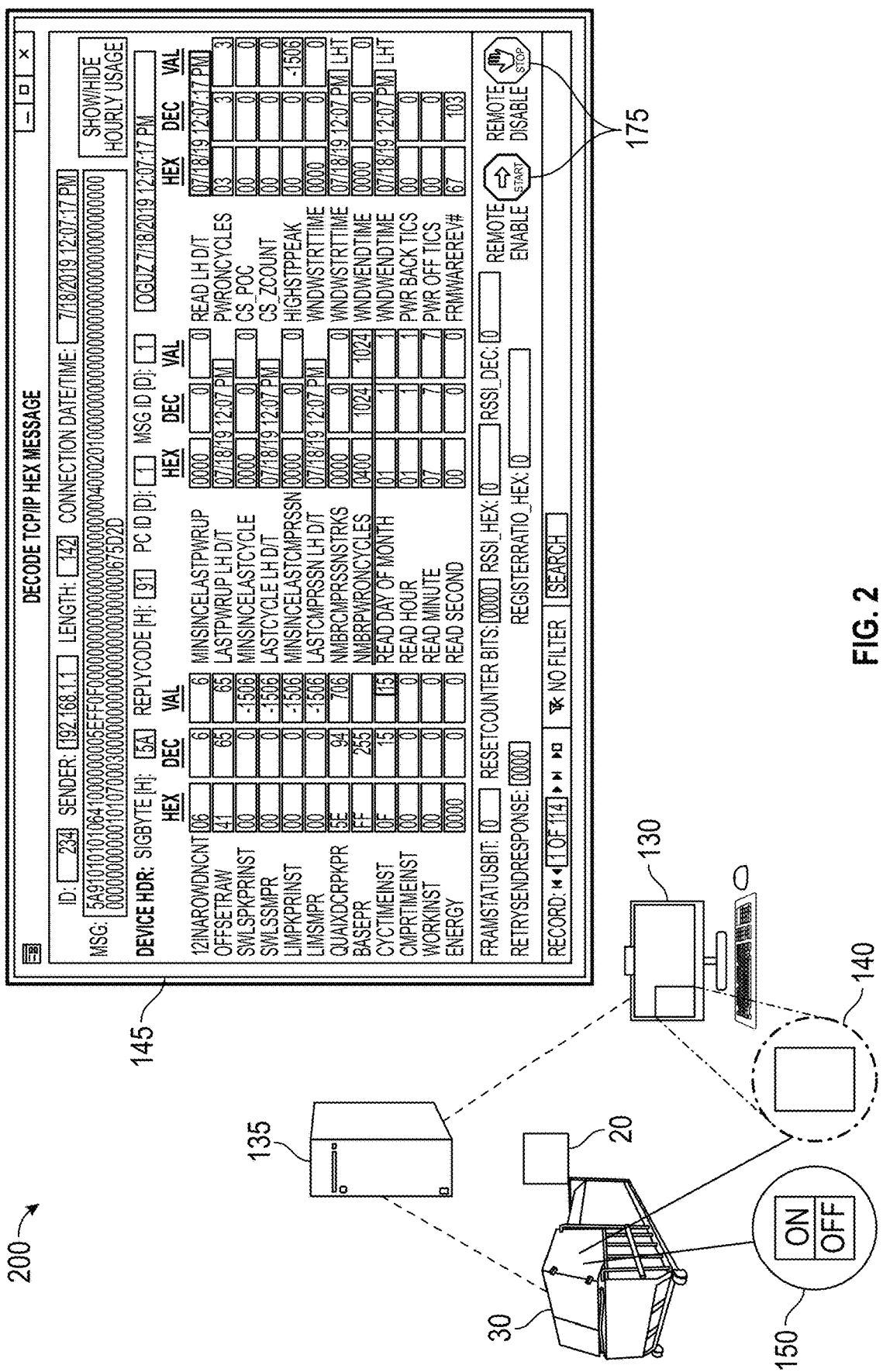
FIG. 2 is a waste compactor with functionally connected remote enablement/disablement capability in accordance with an illustrative embodiment of the presently disclosed subject matter.
Figure 3:
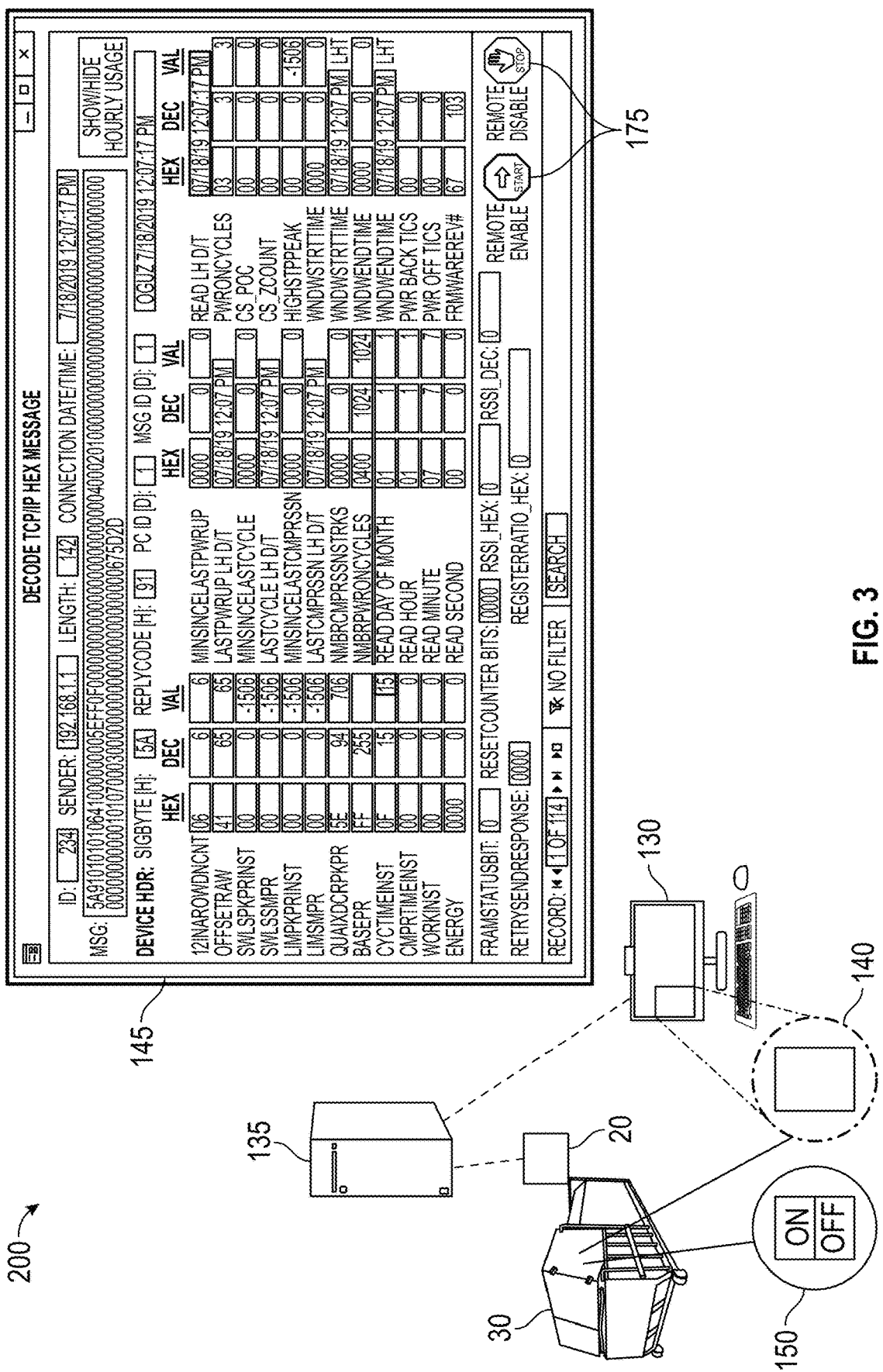
FIG. 3 is a waste compactor and a control/monitoring unit with functionally connected remote enablement/disablement capability in accordance with an illustrative embodiment of the presently disclosed subject matter.

Referring now to FIGS. 1-3, illustrative embodiments of a system 10 including a control/monitoring unit 20 associated with a control panel 25 and power unit 35 for a waste compactor 30 are shown. In the illustrated embodiment of FIG. 1, unit 20 is capable of being functionally associated with waste compactor 30, including, by way of example, mounted on the interior or exterior surface of the control panel 25 for the waste compactor 30 on or near power unit 35 of waste compactor 30. In certain illustrative embodiments, control/monitoring unit 20 can include a power supply 40, a microcontroller 50, a transducer 60, a cell antenna 70, a modem 80, a GPS antenna 90, a fitting 100 that is connectable to a hydraulic hose 110 and a conduit 120 that connects to the control panel 25 of waste compactor 30.

Representative examples of monitoring units and their use are disclosed in, e.g., U.S. Pat. No. 7,406,402 issued Jul. 29, 2008, and currently assigned to WM Intellectual Property Holdings, L.L.C., the contents of which are incorporated by reference herein in their entirety. The described monitoring units can be used for monitoring of compactor fullness, and can monitor, measure and ultimately determine when a waste compactor 30 is nearing fullness capacity and requires being emptied.

In certain illustrative embodiments, the control/monitoring unit 20 described herein is a low power, integrated unit which allows a user to monitor the fullness state of an industrial trash compactor 30.

In certain illustrative embodiments, the control/monitoring unit 20 can incorporate the microcontroller 50 and cellular wireless technologies which allow a user to monitor the fullness state of an industrial trash compactor 30 with high accuracy and predict trash collection times in advance. This allows for just-in-time dispatch of trash haul trucks, which results in reduced operating costs and fuel savings. The presently disclosed system is an example of how the Industrial Internet of Things (IIOT) can help businesses save time and money.

In certain illustrative embodiments, the control/monitoring unit 20 is an integrated wireless unit that can tap into the existing solenoid and motor control outputs of the control panel 25 and controller (PLC) functionality for the compactor 30. The unit 20 can also monitor the pressure levels inside the compactor 30 using the built-in pressure transducer 60 of the compactor 30 that can withstand hydraulic pressures of up to 5,000 psi.

In certain illustrative embodiments, the presently disclosed system 10 can also include wireless relay functionality. For example, the control/monitoring unit 20 can have a cellular modem 80 that is certified for operation on, for example, a 4G LTE network with an external antenna 90 for communication with cellular networks as well as capturing GPS location data from satellites and reporting a location for the compactor 30 to the user at a remote location.

In certain illustrative embodiments, the control/monitoring unit 20 is designed to be integrated inside the control panel 25 or other equipment for the compactor 30 and is protected from weather and the harsh environment that is typical around trash compactors. Unit 20 is also designed for extended temperature ranges. The control/monitoring unit 20 can also be an exterior-mounted unit, i.e., a unit 20 that is physically external to the control panel 25 for the compactor 30 but is integrated with the internal functionality of the compactor 30.

In certain illustrative embodiments, the presently disclosed system 10 can facilitate remote on/off functionality, that is, remote enabling and disabling of the compactor 30 by the user. Referring now to FIGS. 2-3, a system 200 is shown that utilizes the control/monitoring unit 20 (whether internal or external to control panel 25) and can also include remote enabling and disabling functionality. In certain illustrative embodiments, this could be, e.g., a remote signal device 130 with a display interface 145 having a checkbox or a button 175, or a plurality thereof, that appear on the display interface 145 and act as a remote means whereby when this feature is activated, the remote signal device 130 communicates with the control/monitoring unit 20 and/or the compactor 30 in the field to activate a relay that enables or disables operation of the compactor 30.

In certain illustrative embodiments, the remote enabling/disabling functionality can be incorporated with the unit 20 of the compactor monitoring system 10, such that remote signal device 130 communicates with unit 20, and unit 20 communicates with compactor 30. See FIG. 3. In other embodiments, the remote enabling/disabling functionality can be a stand-alone feature that is not incorporated with the unit 20 of a compactor monitoring system 10, and can be used independently to communicate between remote signal device 130 and compactor 30 and control the on/off functionality of the waste compactor 30 directly. See FIG. 2.

In certain illustrative embodiments, a remote disablement system 200 for a waste compactor is disclosed herein that includes a transmitter/receiver 140 on the waste compactor 30, an on/off switch 150 on the waste compactor 30, and a remote signal device 130. The remote signal device 130 can be capable of sending a deactivation signal to a production server 135 that communicates with the transmitter/receiver 140 on the waste compactor 30, either directly or via unit 20. The transmitter/receiver 140 can be capable of communicating with the on/off switch 150 and causing the on/off switch 150 to turn the waste compactor off in response to the deactivation signal.

A remote enablement system 200 for a waste compactor is also disclosed herein. In certain illustrative embodiments, the remote signal device 130 can be capable of sending an activation signal to the transmitter/receiver 140 on the waste compactor 30, either directly or via unit 20. The transmitter/receiver 140 can be capable of communicating with the on/off switch 150 and causing the on/off switch 150 to turn the waste compactor 30 on in response to the activation signal.

A method of deactivating a waste compactor from a remote location is also disclosed herein. In certain illustrative embodiments, a deactivation signal can be provided from a remote signal device 130 to a transmitter/receiver 140 on a waste compactor 30, either directly or via unit 20. The deactivation signal can cause an on/off switch 150 on the waste compactor 30 to turn the waste compactor 30 off (i.e., shut the compactor 30 down).

A method of activating a waste compactor 30 from a remote location is also disclosed herein. In certain illustrative embodiments, an activation signal can be provided from a remote signal device 130 to a transmitter/receiver 140 on a waste compactor 30, either directly or via unit 20. The activation signal can cause an on/off switch 150 on the waste compactor 30 to turn the waste compactor 30 on (i.e., start or restart the compactor 30).

The remote signal device 130 can be disposed at a location that is remote from the waste compactor 30. As used in this context, the term "remote" means not physically connected to the waste compactor 30 and can include locations that are on-site or off-site with respect to the waste compactor 30, such as, for example, where the remote location is a location outside of the room or facility where the compactor 30 is located. Also, the remote on/off instruction could be issued by a variety of different mechanisms. An on/off instruction may be given via remote signal device 130 through a user interface 145 on a desktop or laptop computer (for example, a button press 175 on a graphical user interface), a wireless smartphone, a mobile phone application, personal digital assistant (PDA), or workstation at a user service center. In certain illustrative embodiments, the remote on/off instruction could be controlled by a user that is located in a different city, state, county or other location from the site of the waste compactor 30 and can be utilized for asset management, collections management and/or safety purposes.

The presently disclosed system and method have a number of advantages over prior art technologies. For example, in certain illustrative embodiments, the system and method provide improvements in the following areas, particularly with respect to the remote enable/disable functionality:

Asset Management. A provider can track compactor assets with ease. Benefits of asset management include, without limitation, tracking operational efficiency, maintenance savings, multi-site integration, financial reporting, asset recovery, risk management, forecasting, and accuracy.

Collections Management. If a customer fails to pay its bill, the equipment can be shut down remotely and service can be suspended, and the customer can be sent a message or via an integrated "flashing beacon" asking to be contacted before equipment is turned on again. In this regard, the remote on/off messaging would ignore or override any onsite instructions provided by the customer.

Safety. If there is a recall or a safety concern, the equipment can be shut down remotely and service can be suspended, until the recall or safety issue is addressed or the necessary upgrade is performed. Again, the remote on/off messaging would ignore or override any onsite instructions provided by the customer.

Operational Improvements. In certain illustrative embodiments, the presently disclosed subject matter can provide remote enable/disable functionality for a waste compactor regardless of whether the compactor emits any prior signal or warning, such as a signal or warning that the compactor needs to be emptied or based on a predetermined threshold such as pressure readings or pressure sensors. For example, user interface 145 may display status information indicating that compactor 30 is in a designated condition (e.g., by displaying a light or message), and an operator of user interface 145 may then indicate to user interface 145 (e.g., by pressing checkbox or a button 175 or entering appropriate related commands) that the compactor 30 should be enabled/disabled. In addition, the presently disclosed subject matter can provide the capability for enabling or disabling a run cycle with a single step as compared to a multi-step process previously utilized. The remote cycle feature could be utilized in conjunction with one or more sensors to ensure a safe environment and operation.

Those skilled in the art will recognize that the subject matter described herein may be implemented through the use of a computer system, or other type of device that has some computing mechanism(s). An example system could include a computing device with at least one processing unit and memory. Depending on the exact configuration and type of computing device, memory may be random access memory (RAM), read-only memory (ROM) or some combination of the two.

Those skilled in the art will also appreciate that certain portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A remote monitoring system for a waste compactor, comprising:
   a transmitter/receiver on the waste compactor;
   an on/off switch on the waste compactor configured for enabling and disabling compacting of solid waste and recyclable materials by the waste compactor;
   a remote monitoring device disposed at a location that is remote from the waste compactor and configured to send a deactivation signal to the transmitter/receiver and cause the on/off switch to turn the waste compactor off; and
   a monitoring unit comprising:
   a cellular modem with an external antenna and capable of:
      communicating with a cellular network,
      capturing GPS location data from a satellite, and
      reporting a location for the waste compactor to a user at the remote location; and a microcontroller that is operationally associated with a solenoid and motor control outputs of a control panel and programmable logic controller for the waste compactor.

2. The system of claim 1, wherein the remote location is a location outside of the room or facility where the compactor is located, and wherein the monitoring unit is configured to monitor the pressure level inside the waste compactor using a pressure transducer of the waste compactor.

\* \* \* \* \*